United States Patent
Shmueli

(10) Patent No.: US 9,854,208 B2
(45) Date of Patent: Dec. 26, 2017

(54) SYSTEM AND METHOD FOR DETECTING AN OBJECT OF INTEREST

(71) Applicant: NICE-SYSTEMS LTD., Ra'anana (IL)

(72) Inventor: Yaron Shmueli, Kfar-Saba (IL)

(73) Assignee: Qognify Ltd., Ra'anana (IL)

( * ) Notice: Subject to any disclaimer, the term of this patent is extended or adjusted under 35 U.S.C. 154(b) by 603 days.

(21) Appl. No.: 14/142,854

(22) Filed: Dec. 29, 2013

(65) Prior Publication Data
US 2015/0189240 A1    Jul. 2, 2015

(51) Int. Cl.
| | |
|---|---|
| H04W 24/00 | (2009.01) |
| H04W 4/00 | (2009.01) |
| H04W 64/00 | (2009.01) |
| H04W 12/08 | (2009.01) |
| G01S 3/02 | (2006.01) |
| G06F 7/04 | (2006.01) |
| H04N 7/18 | (2006.01) |
| G06K 9/00 | (2006.01) |
| H04W 4/04 | (2009.01) |
| G08B 13/196 | (2006.01) |

(52) U.S. Cl.
CPC ......... *H04N 7/181* (2013.01); *G06K 9/00671* (2013.01); *G08B 13/1966* (2013.01); *H04N 7/188* (2013.01); *H04W 4/043* (2013.01); *G08B 13/19645* (2013.01)

(58) Field of Classification Search
None
See application file for complete search history.

(56) References Cited

U.S. PATENT DOCUMENTS

| | | | |
|---|---|---|---|
| 2007/0042706 A1* | 2/2007 | Ledeczi | G01S 5/14 455/3.01 |
| 2007/0182812 A1* | 8/2007 | Ritchey | H04N 5/2254 348/36 |
| 2008/0303901 A1* | 12/2008 | Variyath | G01S 5/02 348/143 |
| 2011/0134240 A1 | 6/2011 | Anderson et al. | |
| 2014/0328512 A1* | 11/2014 | Gurwicz | G06K 9/00771 382/103 |

OTHER PUBLICATIONS

Clifford et al. "Attention, Shoppers: Store Is Tracking Your Cell", The New York Times, Jul. 14, 2013 Retrieved from the Internet: http://www.nytimes.com/2013/07/15/business/attention-shopper-stores-are-tracking-your-cell.html?hp&_r=2&.

(Continued)

*Primary Examiner* — Dave Czekaj
*Assistant Examiner* — Alison Slater
(74) *Attorney, Agent, or Firm* — Pearl Cohen Zedek Latzer Baratz LLP

(57) ABSTRACT

A system and method for detecting an object of interest. An embodiment of a system or method may include receiving an indication an object of interest is present in a first area; obtaining, at the first area, a first set of unique characteristics of a respective set of mobile communication devices; receiving an indication the object of interest is present in a second area; obtaining, at the second area, a second set of characteristics of a respective second set of mobile communication devices; and associating a unique characteristic of a mobile communication device with the object of interest based on the first and second sets of characteristics.

17 Claims, 8 Drawing Sheets

(56) References Cited

OTHER PUBLICATIONS

Aviation White Paper: "Why you should be measuring the flow of passengers through your Airport" HUMAN Recognition Systems Retrieved from the Internet: http://info.hrsid.com/passenger-flow-management-white-paper on Oct. 21, 2014.
Blue Eye Video web page, "Blue Count Manager", Retrieved from the Internet: http://www.blueeyevideo.com on Oct. 21, 2014.
Blue Eye Video web page, "Blue Eye Video SA Innovative Queue Management", Retrieved from the Internet: http://www.blueeyevideo.com on Oct. 21, 2014.
Blue Eye Video web page, "Q Enhance Passenger Experience", Retrieved from the Internet: http://www.blueeyevideo.com on Oct. 21, 2014.
Bluelon web page, "Wireless Access Control", Retrieved from the Internet, http://www.bluelon.com on Oct. 21, 2014.
Bluetrace "Brochure", Aug. 5, 2013, Retrieved from the Internet http://www.bluetrace.nl/component/content/article/31 on Oct. 21, 2014.
Blue Eye Video web page, "B-QUEUE, Dynamic Waiting Time Measurement", Retrieved from the Internet, http://www.blueeyevideo.com on Oct. 21, 2014.
Blue Eye Video web page, "B-TOP, People Counter", Retrieved from the internet, http://www.blueeyevideo.com on Oct. 21, 2014.
HUMAN Recognition Systems web page, "M-FLOW, Passenger Flow Management", Retrieved from the internet https://www.hrsid.com/product-mflow.php on Oct. 21, 2014.

* cited by examiner

| Unit S/N 101 | Signal 105 | GIS unit location 110 | Date 115 | Time 120 | MAC Address 125 | RSSI 130 | Device class 140 |
|---|---|---|---|---|---|---|---|
| 101 | WiFi | 32.198047, 34.882462 | 30-7-2013 | 11:34:00 | 18:22:3A:4B:55:7F | −70 | −1 |
| 102 | BT | 32.198158, 34.882550 | 30-7-2013 | 11:34:10 | 89:65:82:79:78:83 | −40 | 17 |

| Video objects | Location #1 | Location #2 | Location #3 | Location #4 |
|---|---|---|---|---|
| | A,B,C | D | B,E,A | E,F,B |
| Iteration #0<br>User video object selection (B) from location #1 | 18:22:3A:4B:55:7F<br>89:65:82:79:78:83<br>18:22:3B:BF:D5:38<br>11:87:95:46:5F:D3 | 38:18:5F:BF:D5:12<br>42:57:6F:3D:21:23 | 16:1F:4B:5E:68:12<br>18:22:3B:BF:D5:38<br>89:65:82:79:78:83 | 16:1F:4B:5E:68:12<br>89:65:82:79:78:83<br>4C:E5:C8:1A:36:67 | ~810
| Iteration #1<br>User video object selection from location #2<br>(object not found - MAC address deletion) | 18:22:3A:4B:55:7F<br>89:65:82:79:78:83<br>18:22:3B:BF:D5:38<br>11:87:95:46:5F:D3 | ~~38:18:5F:BF:D5:12~~<br>~~42:57:6F:3D:21:23~~ | 16:1F:4B:5E:68:12<br>18:22:3B:BF:D5:38<br>89:65:82:79:78:83 | 16:1F:4B:5E:68:12<br>89:65:82:79:78:83<br>4C:E5:C8:1A:36:67 | ~820
| Iteration #2<br>User video object selection (B) from location #3<br>(Mark matching MAC addresses from past locations) | ~~18:22:3A:4B:55:7F~~<br>89:65:82:79:78:83<br>18:22:3B:BF:D5:38<br>~~11:87:95:46:5F:D3~~ | ~~38:18:5F:BF:D5:12~~<br>~~42:57:6F:3D:21:23~~ | ~~16:1F:4B:5E:68:12~~<br>18:22:3B:BF:D5:38<br>89:65:82:79:78:83 | 16:1F:4B:5E:68:12<br>89:65:82:79:78:83<br>4C:E5:C8:1A:36:67 | ~830
| Iteration #3<br>User video object selection (B) from location #4<br>(Mark matching MAC addresses from past locations - unique match is found!) | ~~18:22:3A:4B:55:7F~~<br>89:65:82:79:78:83<br>18:22:3B:BF:D5:38<br>~~11:87:95:46:5F:D3~~ | ~~38:18:5F:BF:D5:12~~<br>~~42:57:6F:3D:21:23~~ | ~~16:1F:4B:5E:68:12~~<br>18:22:3B:BF:D5:38<br>89:65:82:79:78:83 | ~~16:1F:4B:5E:68:12~~<br>89:65:82:79:78:83<br>~~4C:E5:C8:1A:36:67~~ | ~840

SYSTEM AND METHOD FOR DETECTING AN OBJECT OF INTEREST

FIELD OF THE INVENTION

The present invention is in the field of video surveillance. In particular, the present invention is directed to identifying and tracking a reference object.

BACKGROUND OF THE INVENTION

Video surveillance is widely used. For example, suspect search systems that identify, track and/or monitor an individual use video surveillance or video monitoring. Video Content Analysis (VCA) or video analytics are known and used, e.g., for automatic analysis of a video stream to detect or identify points of interest. Video analytics is becoming more prevalent in a wide range of domains such as security, entertainment, healthcare and surveillance.

However, systems that depend on input from cameras suffer from a number of drawbacks. Known systems use search algorithms or methods that may work well when provided with input from a single camera's field of view (FOV), but are unable to process multiple FOV's input. Other methods do process multiple FOV's, but assume clear overlaps between the FOV's, which, for most real-world scenarios, is not the case. Other known systems and methods are based on tracking, which is prone to fail in densely populated areas. Yet other systems and methods may fail when input images are acquired in varying conditions, e.g., a change in lighting, indoor/outdoor, angles, different cameras' settings, etc.

SUMMARY OF EMBODIMENTS OF THE INVENTION

An embodiment of a system or method for detecting an object of interest may include receiving an indication that an object of interest is present in a first area and obtaining a first set of characteristics of a respective set of mobile devices, the set of mobile devices located in the first area. An embodiment of a system or method for detecting an object of interest may include receiving an indication that an object of interest is present in a second area and obtaining a second set of characteristics of a respective second set of mobile devices, the second set of mobile devices located in the second area. An embodiment of a system or method may associate a characteristic of a mobile device with the object of interest based on the first and second sets of characteristics.

An embodiment of a system or method may track an object of interest by tracking a mobile device associated with the object of interest. An embodiment of a system or method may associate a communication device with an object of interest by including a media access control (MAC) address in a signature of the object of interest. A mapping of received signal strength indicator (RSSI) values to a field of view of a camera or to a display screen may be generated. RSSI values related to signals received from communication devices may be used to locate an object of interest in an image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 8 graphically illustrates manipulation of data according to embodiments of the invention;

Figures 1, 2:
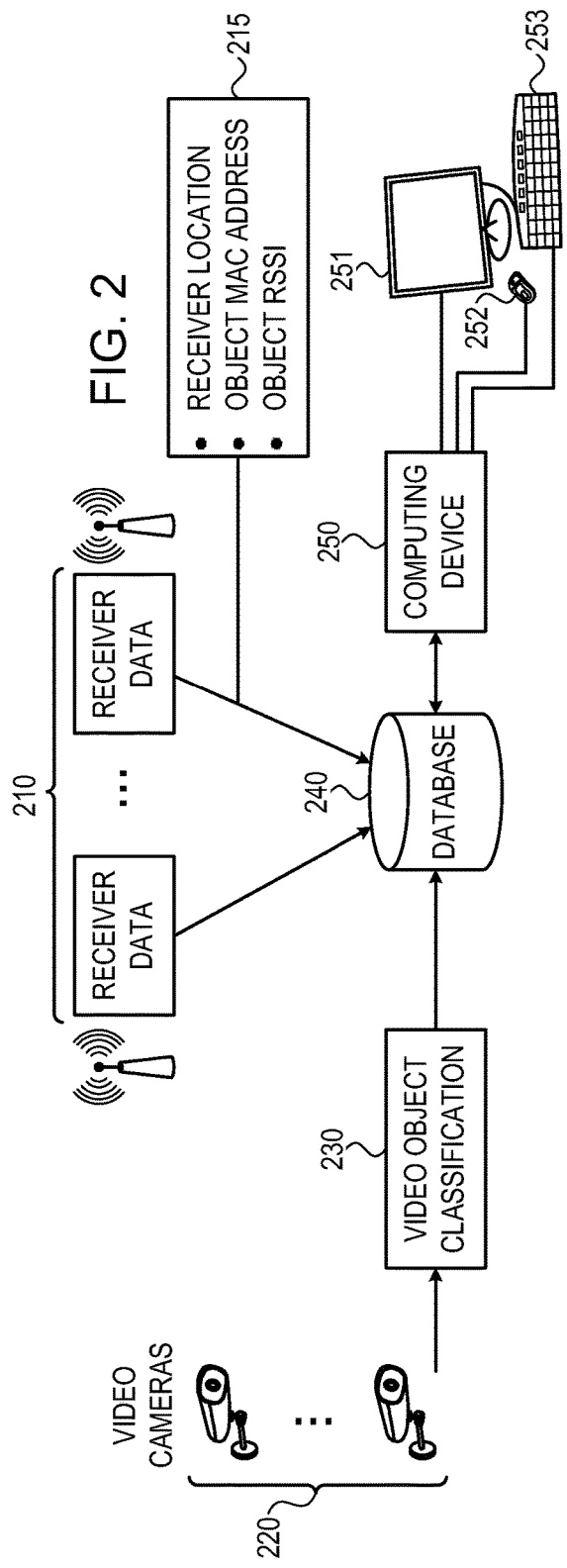
FIG. 1 shows metadata according to embodiments of the invention.
FIG. 2 is a schematic block diagram of an exemplary system according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

As referred to herein, a reference object (RO) is a digital image of an object of interest, e.g., a digital image of a person, a briefcase or a car. The terms RO and object of interest may be used herein interchangeably. For example, having captured an image of an object of interest (e.g., a person), the image may be used (and referred to herein) as an RO. For example, when searching for a specific person (the object or interest), an image of that person may be used as an RO and the RO may be used in order to determine whether or not other images (also referred to herein as candidate objects (CO)) are images of that person. Embodiments of the invention may try to match ROs to COs, and thus identify one of numerous COs as being an RO. E.g., an embodiment of the invention may try to identify or find an RO among COs, where the identified or found CO is an image different from the RO's image but which is an image of the same person or object.

In one embodiment, in order to determine whether or not an RO and CO are related to the same object or person, or are images of the same object or person, signatures generated for the RO and CO are compared or otherwise related. For example, an embodiment of a system or method for of detecting an object of interest may generate a first signature for the object of interest based on an image of the object of interest; generate a second signature for a candidate object based on an image of a candidate object; calculate a similarity score or rating by relating the first signature to the second signature and determine if the image of the candidate object is an image of the object of interest based on the similarity score. It will be noted that a first signature may be generated based on an image acquired by a first camera and a second signature may be generated based on an image acquired by a second, different camera. A signature for an object of interest may be generated based on any information in an image of the object of interest. For example, an embodiment may analyze an image of an object of interest and determine features such as skin color, color of eyes, height, or any other physical attributes of a person and generate a signature for the person based on his or her physical attributes or characteristics. For example, a race, age and gender may all be determined, identified or characterized and a signature may be generated such that it uniquely identifies a person. By determining, identifying or characterizing more and more attributes of a person or object, and representing determined, identified or characterized attributes in a signature, a signature may be generated such that it is unique for an individual, e.g., a signature generated for a first person is different from a signature generated for a second, different person. As described herein, possibly in addition to characteristics of a communication device used by a person may be included in a signature.

A first camera at a first location may acquire an image of an object of interest and a second camera, placed at a second location may acquire an image of a candidate object. A first signature may be generated based on an image acquired by a first camera and a second signature may be generated based on an image acquired by a second, different camera. For example, a first camera at a first location may acquire an image of an object of interest and a second camera, placed at a second location may acquire an image of a candidate object. Signatures may include characteristics of an object (as represented in an image) and calculating a similarity score may include relating characteristics of a first object to characteristics of a second object.

As described herein, a signature of an object of interest may be generated based on a characteristic of a device operated or used by the object of interest. Generating a signature may include obtaining signals from a plurality of devices in a plurality of areas or regions; determining, based on the signals, a set of devices that were present in at least two locations where the object of interest was present and at the same times the object of interest was present at those locations; associating each of the devices in the set with a score or rating based on the number of presences of the device at the locations and at the times where and when the object of interest was present; associating a device with the object of interest based on the score; and generating the signature for the object of interest based on information related to the device.

Generating signatures may be based on information transmitted by a communication device. For example, a user identification attached to messages sent from a devices operated by the user (that may be the object of interest) may be included in a signature generated for the user. Accordingly, determining a similarity score may include comparing or relating information sent by communication devices of users. For example, a user identification code (e.g., as included in messages related to social network messages or protocols) or value sent by a communication used by a suspect may be compared to user identification codes in messages sent by communication devices used by people in a location and an embodiment of a system or method may determine that a candidate object (e.g., a person) is indeed the object of interest (e.g., the suspect being searched for) based on a match of an identification code in messages as described.

Systems and methods according to embodiments of the invention may enable searching for an object of interest based on signals received from a communication device associated with the object of interest. For example, systems and methods according to embodiments of the invention enable finding a person (the object of interest) and/or tracking the person based on signals transmitted by a smartphone or a mobile computer used by the person.

In an embodiment, a system and method may use input received from a tracking or suspect search system that uses cameras. For example, to generate an indication that an object of interest is present in an area, a user may select an image that shows the object of interest. For example, a system that includes cameras may present images to a user and the user may indicate a person is present in a specific location by clicking an image. Since the location of the camera that captured the image of the person and the time the image was captured may be known, the time and place where an object of interest is (or was) present may be known.

For example, images captured by cameras 220 (shown in FIG. 2) may be displayed on display 251 connected to computing device 250 as shown in FIG. 2. Using mouse 252 (also shown in FIG. 2), a user may click on an image (e.g., use a pointing device such as a mouse to manipulate an on-screen pointer, and indicate or click on the mouse) to indicate that the image shows an object of interest. In an embodiment, a user may use keys on keyboard 253 in order to indicate that the image shows an object of interest. For example, a user may use the arrow keys in keyboard 253 to place a cursor on an image of a suspect and then press a predefined key to indicate that the cursor is placed on the object of interest.

An embodiment of a system or method may provide an indication that a person (object of interest) is present in one or more locations at respective one or more time periods. For example, images of people in an airport are captured by video or other cameras and are presented to a user and the user may indicate that a suspect (e.g., a person for which a search is conducted) is shown in an image.

In an embodiment, each image presented to a user is associated with metadata that includes an identification of the camera that acquired the image and the time when the image was acquired. Accordingly, based on an indication of a user (or based on automatic determination that an object of interest is shown in an image), an embodiment of a system or method may readily determine where and when an object of interest is or was present. For example, if it is determined (e.g., based on an indication of a user) that a person is shown in an image acquired at the time 12:33 by a camera placed in a lobby of a hotel then the place and time where and when that person was present may be readily determined.

In an embodiment, a system and method collect signals received from communication devices and use collected signals in order to associate a specific communication device with a specific object of interest. For example, an embodiment of a system or method may determine that a specific person is using a specific laptop computer or a specific smartphone. Once a particular or specific communication device is associated with a person or with an object of interest, the object of interest may be searched for, located and/or tracked by searching for, locating or tracking the associated communication device. For example, if a presence of a mobile communication device in a location is determined based on signals received from the device, an alert may be automatically generated.

For example, computing device 250 (or database 240) may keep a black list of objects of interest and the black list may include MAC address of communication devices used by the objects in the black list. Computing device 250 may be configured to generate an alarm according to rules. For example, a rule may dictate that if a device with specific MAC address is detected in a predefined location then an alarm should be generated. An alarm may include displaying a warning on a display screen attached to computing device 250 or to another (e.g., remote) computing device. An alarm may include sounding an alarm via speakers of a computing device. An alarm may include sending electronic mail to a predefined recipient list, updating a log file and the like. Accordingly, once a MAC address is associated with a suspect or other object of interest, an indication that the object of interest is present at a predefined place may be generated by receiving signals from a device that uses the associated MAC address. Further, an alarm may be generated upon detecting presence of the object of interest as described.

Applicable communication devices may be any mobile communication devices such as smartphones, laptop computers, tablet computers and the like. For example, applicable mobile communication devices may any be devices that use wireless or radio frequency networking technology, e.g., Bluetooth (BT), WiFi or third Generation (3G) mobile telecommunications technology. Typically, a MAC address of a communication device is unique and no two devices share the same MAC address. Accordingly, presence of a MAC address in a location as referred to herein may also indicate or mean presence of the communication device associated with the MAC address. Accordingly, phrases such as "MAC addresses located in an area" are to be understood as referring to a location in the area of communication devices that use the MAC addresses.

In an embodiment, a set of receivers are deployed in an area of interest. The receivers receive transmissions from mobile communication devices present in the area. For example, an area of interest may be an airport terminal, a train station or any other applicable area or location. For example, in an embodiment, an area covered by video or other cameras is also covered by receivers described herein. Accordingly, in an embodiment, both images of objects and signals transmitted by communication devices used by the objects may be obtained, at the same time and at the same location.

Any receivers may be used in order to receive or obtain signals of communication devices in a location or areas. For example, receivers equipped with antennas are deployed in an area or location and are configured to receive signals transmitted by communication devices in the area or location.

In an embodiment, signals transmitted by communication devices in an area and received by receivers in the area are analyzed to produce metadata and metadata may be stored. The signals themselves may also be stored. For example, in an embodiment, both signals and metadata are stored. For example, signals received by a receiver are analyzed to produce metadata, the metadata is stored, and the signals are stored in association with the stored metadata. In one embodiment, receivers described herein analyze or process received signals to produce metadata and the receivers provide the metadata to other components of a system. In another embodiment, receivers provide signals received to a computing device and the computing device analyzes or processes received signals to produce metadata.

Metadata of a signal may be a time stamp that indicates the time when the signal was received. Metadata of a signal may include a location where the signal was received. For example, each receiver may be associated with an identification code or number, and, when providing received signals, a receiver may also provide its identification information, e.g., a code uniquely identifying the receiver. Accordingly, a table associating receivers' identifications with receivers' locations may be used in order to determine where a signal was received. In an embodiment a receiver may include a unit that determines the receiver's location (e.g., a global positioning system (GPS) unit) and the receiver may include its location when sending captured or received signals or when sending metadata related to signals.

In an embodiment a receiver may record the time when a signal was received and may provide information related to the signal and a timestamp that indicates when the signal was received. In another embodiment, a component (e.g., a server computer) that receives signals from receivers may associate a time stamp with received signals when it receives the signals from the receivers. Accordingly, a system or method according to an embodiment may readily determine (and include in metadata described herein) when and where a specific signal from a specific device was received.

Metadata of a communication device may include a characteristic of the device or a characteristic of transmitted signals or data. In an embodiment, a characteristic of a communication device is a unique characteristic. Each communication device may be identified by one or more unique characteristics. For example, MAC addresses are allocated to network cards (NICs) or other receiver/transmitter components in communication devices such that no two communication devices have the same MAC address. For example, various networking protocols depend on the uniqueness of MAC addresses and, accordingly, in order for a network to function properly, a MAC address is a unique characteristic of a communication device. A MAC address is included in signals transmitted by a mobile communication device. In an embodiment, the MAC address is included in metadata associated with a signal as described herein.

Another characteristic of a communication device that may be identified and included in metadata of the communication device is RSSI. As known in the art, RSSI is a measurement of the power of a received radio signal. A receiver may determine the RSSI metric or value of a received signal. For example, the RSSI may be measured by the receiver.

Although MAC address is mainly referred to herein as a unique characteristic of a communication device, it will be understood that other unique characteristics of a communication device may be any applicable characteristics, data, parameters or attributes. For example, transmission patterns, data types or protocol types may all be identified by analyzing signals transmitted by a communication device and may used as unique characteristics of a device as described herein. For example, if a first user of a smart phone (smartphone) mostly or only uses text messages transmitted over 3G networks while a second user only uses WiFi to communicate data then the first and second devices (and, accordingly, the users) may be characterized based on the type of network used. In another case, a first user may typically use his communication device to send long messages (e.g., video clips) while a second user may only use her communication device to send short messages (e.g., text messages). Such two users may be characterized (by respectively characterizing their communication devices) based on the bandwidth they produce using their respective devices.

In an embodiment, metadata produced by analyzing signals received from communication devices is stored in a database. For example, a database includes, for each MAC address included in data sent by a communication device, a location and a time period such that an embodiment of a system and method may readily determine where and when a relevant communication device was present. For example, for each location or area of interest, a database may include an entry per time slot (e.g., one minute) and, for each time slot, the database may include all MAC addresses seen in the area of interest during the time slot.

Reference is made to FIG. 1 that graphically shows metadata stored in a database according to embodiments of the invention. As shown by column 101, a unique identification may be associated with each entry in a database. For example, the identification associated with a device may be used throughout an embodiment of a system to enable components of the system to refer to a specific device. As shown by column 105, the type of transmission protocol may be indicated. For example, by analyzing received signals, the protocol (e.g., WiFi, BT etc.) used for transmitting the signals may be determined and recorded in a database as shown. As shown by column 110, the location where the signals were received may be recorded. For example, based on the location of the receiver that received the signals the location may be determined and recorded as shown. As shown by column 115, a date may be recorded, e.g., based on the date that the signal was received. As shown by column 120, a time when a device with a specific MAC address was "seen" (e.g., a signal from the device was received) may be recorded. For example, a server records the time a signal from a device with the MAC address was received. In other embodiments, a receiver may record the time signals from a specific MAC address were received.

In an embodiment, millisecond (mSec) resolution of time information is used to enable better synchronization of a location of an object of interest with video data. For example, three receivers may each receive signals from MAC address 18:22:3A:4B:55:7F. Each receiver records the time the signal was received and the RSSI of the signal. Using a mapping of received RSSI values to a field of view of a camera or to a display screen, the location of the device can be mapped to a display screen of a computer. For example, the device, and the person holding the device, are automatically marked. By using millisecond resolution of time information, video rate of 25 or 30 frames per second (FPS) can be supported such that for each video frame there exists a respective location data calculated based on signals received from a communication device.

As shown by column 125, a MAC address may be included in data. For example, the location, time, device time and RSSI in a row or entry as shown in FIG. 1 may be related to a device with MAC address as indicated in column 125. As shown by column 130, the RSSI metric or value may be recorded. As shown by column 140, the device class or type may be recorded. For example, in an embodiment, devices are classified as "mobile phone", "tablet", "PC", and the like. Other classifications may be used.

As described herein, an embodiment of the invention may receive an indication that an object of interest is present in a first area. For example, images may be presented to a user and an embodiment of a system or method may receive, from the user, an indication that a suspect (object of interest) is present in a first area.

Based on a time and place where and when an object of interest is or was present, an embodiment of a system or method may select a first set of characteristics of a respective set of mobile devices which are (or were) located in the place where and when an object of interest is (or was) located or present. For example, if, based on an indication from a user, it is determined that a person for which a search is conducted was present in a first location during a first period of time then the set of MAC addresses of devices that were present (or located) at the first area during the first period of time may be obtained from a database. For example, provided with an indication of a time and place as described herein, using data collected and stored as shown by FIG. 1, an embodiment of a system or method may retrieve from a database all MAC address of devices that were present (or located) in a location (e.g., based on a location as shown by column 110) at a specific time (e.g., based on a time as shown by column 120). An embodiment of a system (or of a method) may search for a specific MAC address in the set of MAC addresses retrieved from the database. It will be understood that the structure shown in FIG. 1 is an exemplary and simplified one and that other structures may be used. For example, database 240 described herein may be a relational database and metadata or other data described may be stored such that searches are quick and efficient. For example, storage of MAC addresses, times and locations may be such that searching for all MAC addresses of devices present or located in a location at a given time or searching for locations where a device with a specific MAC address was present is fast and efficient.

For example, a database that stores, for each location of interest and for each time slot, a set of MAC addresses may be used in order to select a set of relevant MAC addresses. In an embodiment, a structure as shown by FIG. 1 may be used in order to select a set of MAC addresses based on a location and time. For example, after a user indicates a time and location when and where a suspect was present, a table as shown by FIG. 1 may be used, the location and time entries in the table may be examined and, for each row where the location and time match the location and time indicated by the user, the MAC addresses may be extracted and included in a set of characteristics as described.

Based on a second time and a second place where and when an object of interest is or was present, an embodiment of a system or method may select a second set of characteristics of a respective second set of mobile devices which are (or were) located in the place where and when an object of interest is or was located or present. For example, if, based on an indication or input from a user, it is determined that a person for which a search is conducted was present in a second location during a second period of time then the second set of MAC addresses of devices that were present or located at the second area during the second period of time may be obtained from a database.

Using the first and second sets of MAC addresses, an embodiment of a system or method may determine a unique characteristic of a mobile device used by the object of interest and may associate the mobile device (and/or the unique characteristic) with the object of interest. For example, a MAC address may be associated with a person.

In an embodiment, associating a unique characteristic of a mobile device with the object of interest includes an elimination process applied to a number of sets of unique characteristics of communication devices. For example, if it is determined that only one MAC address in a set of MAC addresses is present or located in each of the locations where and when the object of interest is or was present then the MAC address (and accordingly, the relevant communication device) may be associated with the object of interest. In an embodiment, any number of iterations may be performed to produce a number of sets of MAC addresses and MAC addresses not appearing in all sets may be excluded until a single MAC address is left. The process of associating a MAC address with an object of interest (e.g., a person) is further described with reference to FIG. 7 and FIG. 8 below.

Reference is made to FIG. 2 that shows an embodiment of a system according to embodiments of the invention. As shown by blocks 210, an embodiment of a system may include a plurality of receivers configured to receive signals transmitted by mobile computing devices. For example, receivers 210 receive BT, WiFi or other signals transmitted by smartphones, laptops or other communication devices used by people in an area where receivers 210 are located.

As shown by block 215, receivers 210 may send receiver data to database 240. As indicated, receiver data may include a receiver location, a MAC address object and an RSSI object. For example, a receiver included in receivers 210 may send to database 240 a MAC address and an RSSI value of a communication device. For example, a receiver included in receivers 210 receives signals from a communication device, extracts the MAC address and the RSSI value from the received signals and transmits these parameters and/or values to database 240. Receiver data may include additional data. For example, a time stamp that indicates when a signal was received may be included in receiver data 215. An identification of a receiver that sends receiver data 215 may be included in receiver data 215.

As shown by cameras 220, an embodiment of a system may include a plurality of cameras. For example, cameras 220 (and receivers 210) may be located in a train station, an airport terminal and the like. As shown by block 230, an embodiment of a system may include a video object classification unit or system. For example, video object classification 230 may generate a signature of object captured by cameras 220. For example, signatures may be generated by processing images of objects captured by cameras 220 and the signatures may be stored in database 240. Computing device 250 may be a server computer or any other suitable computing device. In an embodiment, computing device is similar to computing device 1100 as described with reference to FIG. 10. Although as shown, data from receivers 210 and cameras 220 is sent to database 240, in some embodiments, receiver data 215 and data from cameras 220 are sent from receivers 210 and cameras 220 to computing device 250. Computing device may process received data to produce processed data and may store received data and processed data in database 240. Database 240 may be any suitable database. For example, database 240 may be a relational database that enables retrieving any data given a key. For example, given a MAC address, database 240 may quickly retrieve and provide any entry or information related to the given MAC address. For example, database 240 may support any database queries as known in the art.

According to embodiments of the invention, regions or areas in a field of view (FOV) of a camera may be mapped to, or correlated with, RSSI values. Otherwise described, an RSSI values map fit to a FOV or display screen may be generated. According to embodiments of the invention, regions or areas in display screen may be mapped to, or correlated with, RSSI values. For example and as described herein, an embodiment of a system and/or method according to embodiments of the invention map sets of RSSI values to pixels in a display screen of a computer such that if a user clicks on a region in the display screen, MAC addresses of devices shown in the region (or used by objects shown in the region) may be determined.

Accordingly, an embodiment of a system or method may include receiving an indication of a location of an object of interest in an image and obtaining or selecting a set of characteristics of a respective set of mobile devices based on the location. For example, upon receiving an indication of a location of a person based on a click of a user on a display screen, the set of characteristics selected will be the set of MAC addresses of devices present or located at the location indicated.

Figure 3:
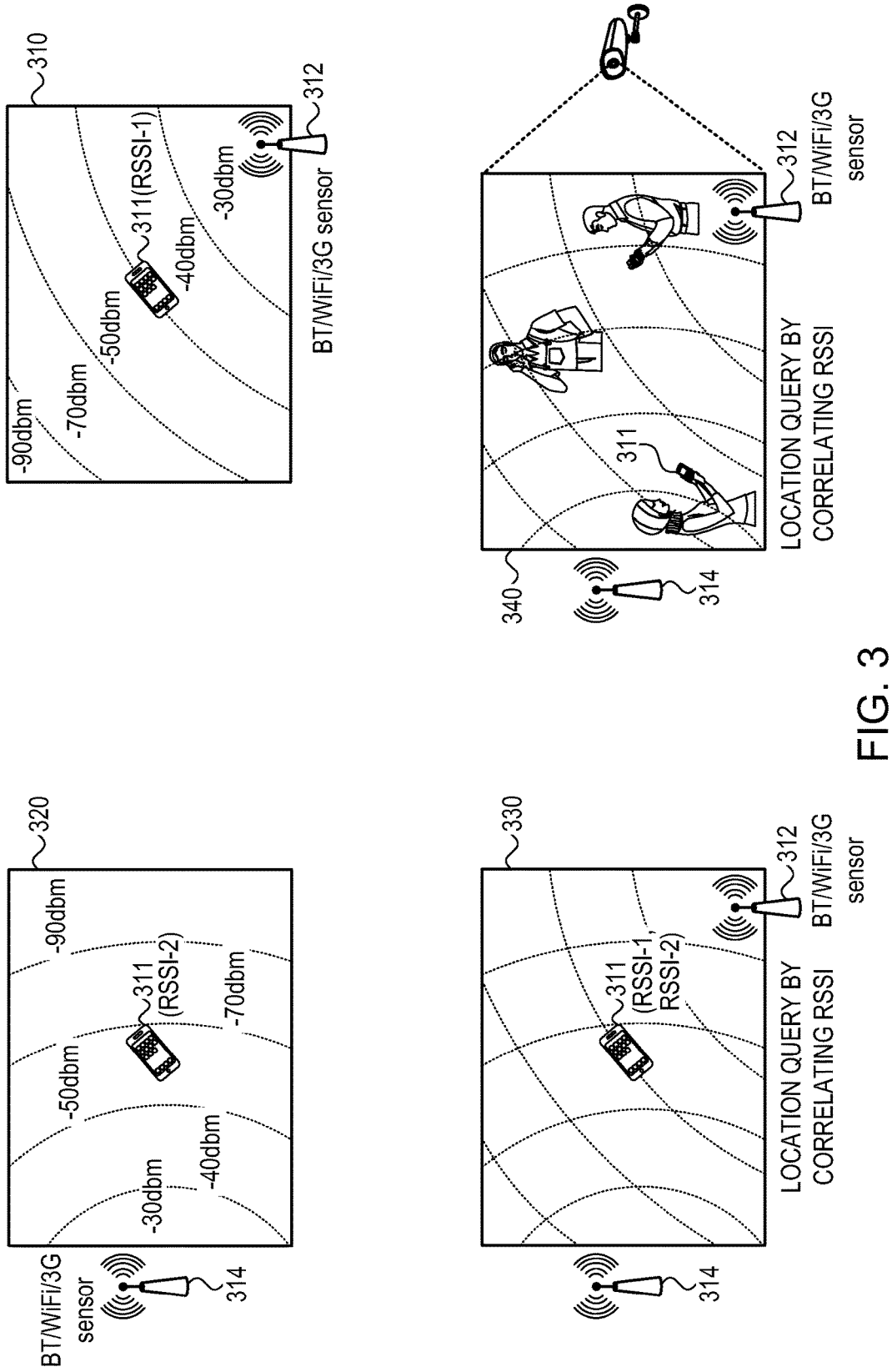
FIG. 3 graphically illustrates mapping received signal strength indicator (RSSI) values to a field of view (FOV) of a camera or to a display screen of a computer according to embodiments of the invention.

Reference is made to FIG. 3 that graphically illustrates mapping RSSI values to a camera's FOV or to a display screen of a computer.

As shown by block 340, a camera defines an FOV. The field of view of a camera may be duplicated or presented on a display screen of a computer. Accordingly, any mapping of a camera's field of view may be mapped to pixels in a display screen of a computer and vice versa.

As shown by blocks 310 and 320 a number of mappings may be generated for a number of receivers. For example, the RSSI values received by the receiver in block 310 are different then those received by the receiver in block 320. As shown by block 330, mappings created using a number of receivers may be combined and the combined mapping may be used to correlate RSSI values received by a number of receivers with an FOV or with a display screen of a computer.

As shown by blocks 310 and 320, receivers may be placed such that signals generated by devices in the camera's FOV are received by the receivers. Mobile communication devices may be operated in an area covered by the FOV and the RSSI values may be recorded for each device in a plurality of locations in the FOV. For example, mobile device 311 may be operated at a point as shown by block 310 and the RSSI value received by receiver 312 may be recorded as indicated by RSSI-1. Next, mobile communication device 311 may be operated at the same point as shown by block 320 and the RSSI value received by receiver 314 may be recorded as indicated by RSSI-2. As shown by block 330, by overlaying measurements, a mapping of RSSI value sets to points in the FOV may be produced. For example, the RSSI set of (RSSI-1, RSSI-2) is mapped to the point where RSSI values were measured as described. As shown by block 340, communication device 311 held by a person in an FOV or as presented on a display screen may be associated with the set of RSSI values according to the mapping described herein. For example, in the current example, communication device 311 as shown in block 340 (or a relevant set of pixels, or a region in a display) is associated with the set of RSSI values (RSSI-1, RSSI-2). For example, if the MAC address of a device used by a suspect is known, the location of the suspect is determined by an embodiment of a system or method using RSSI values and MAC address data and, using a mapping as described, the suspect can be pinpointed on a display screen.

For the sake of clarity, only one communication device and two receivers were described in describing a mapping of RSSI values to a FOV. In embodiments, mapping of RSSI values to a FOV may be performed using several different mobile devices and a large number of receivers and an average RSSI per point or region in the FOV may be calculated. The number of receivers used to map RSSI values to a FOV may be increased to increase accuracy of the mapping. Of course, the set of RSSI values associated with a point increases as the number of receivers is increased. For example, if four receivers are used then instead of sets of two RSSI values as described herein, sets of four RSSI values may be mapped to point or locations in an FOV or to pixels in a display screen.

Information used or generated by geographic information systems (GIS) may also be obtained and used. For example, in addition to recording RSSI values in an area covered by an FOV of a camera, GIS data may be recorded. For example, communication device 311 may be equipped with a GPS unit and may transmit its exact location. For each point in an FOV, in addition to recording the RSSI values of a mobile communication device as measured, calculated or received by a plurality of receivers, the location of the mobile communication device (e.g., in the form of coordinates) may be recorded. Once a mapping between points or locations in an FOV and the RSSI values of the points or locations exists, an embodiment of a system or method may track a device in an FOV based on RSSI values.

In some embodiments, receivers are incorporated in the cameras. For example, units that include both cameras and receivers as described herein may be used. A unit that includes both a camera and a receiver may be calibrated such that the mapping of RSSI values and regions in a FOV are known in advance. Accordingly, a unit that includes both a camera and a receiver may readily provide a mapping of objects identified by receivers to a display or to a FOV.

In an embodiment, receivers continuously receive signals, process the signals to produce metadata and communicate metadata to a database. In an embodiment, receivers periodically or upon event send metadata to the database. For example, a receiver may periodically (e.g., every 10 seconds) send a list of MAC addresses and associated RSSI values to a database. The metadata may be stored in the database. Accordingly, if a path of a device with a known MAC address needs to be determined, the database may be searched for metadata related to the MAC address and using the associated RSSI value sets and a mapping of RSSI value sets to an FOV, the path taken by the communication device may be determined In another embodiment, a path traversed by a communication device may be determined or tracked on-line. For example, receivers may send, in real-time, metadata related to a specific MAC address including RSSI value and, using a mapping as described, the path of the communication device may be tracked in real-time and presented on a display screen.

Figure 4:
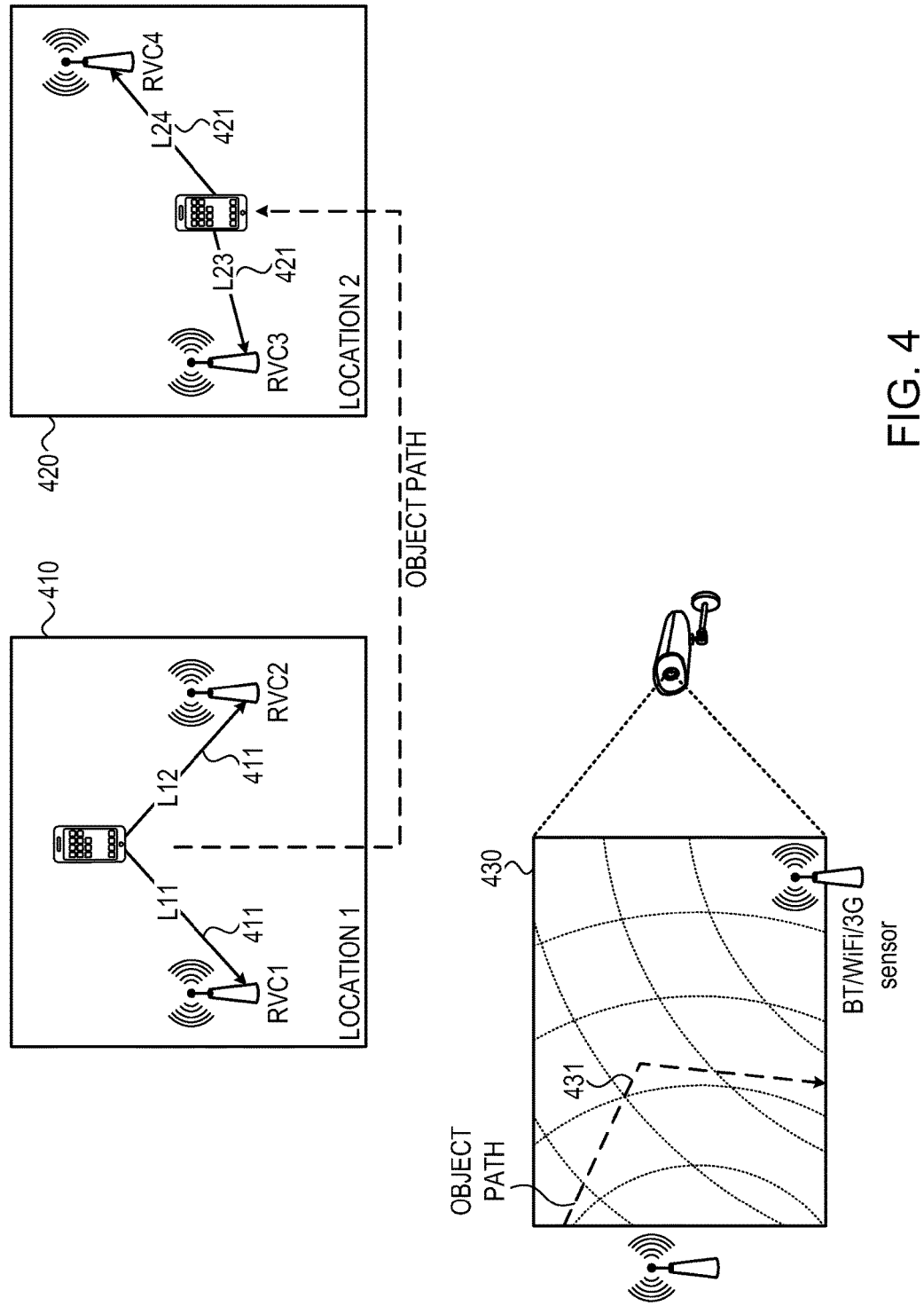
FIG. 4 graphically illustrates tracking a communication device according to embodiments of the invention.

Reference is made to FIG. 4 that graphically illustrates tracking a communication device. As shown by RSSI values 411 in block 410, RSSI values of a signal received by two receivers may be determined and recorded in a first location of the communication device. As shown by RSSI values 421 in block 420, RSSI values of a signal received by the two receivers may be determined and recorded in a second location of the communication device. As shown by block 420, using a mapping of RSSI values to a FOV, a path 431 of the communication device may be determined. It will be understood that provided with location information based on RSSI values as described, a path may be generated in general, e.g., not only with respect to an FOV of a camera. For example, a path generated may include a set or sequence of coordinates and time values that describe a path.

For example, if the process described herein is performed in real-time then the path 431 may be determined (and presented on a display screen) in real-time. If collecting the RSSI values of the communication device is performed at a first time (e.g., as part of continuously recording metadata in an area as described) then determining path 431 may be performed at any later stage using metadata stored in a database as described herein. Accordingly, an embodiment of a system and/or method may map RSSI values to a field of view of a camera and may use the mapping to present a path traveled by an object of interest based on a signal generated by an associated mobile device. For example, having associated a smartphone with a person (e.g., by associating the MAC address of the smartphone with the person), a path taken by the person (either when taken, or taken any time in the past) may be determined and the path may be presented on a display screen or otherwise used. Since metadata may be continuously or periodically recorded as described, a path determined may be with reference to time. For example, if the same RSSI value sets for a device are measured during a time period (e.g., five minutes) then it may be determined that the person using the device was at the same point for five minutes. For example, a path determined as described may be used in order to determine whether or not a person was in a specific location, how long the person stood still in the location and so on. Accordingly, tracking an object of interest may be by tracking a mobile device associated with the object of interest.

Figure 5:
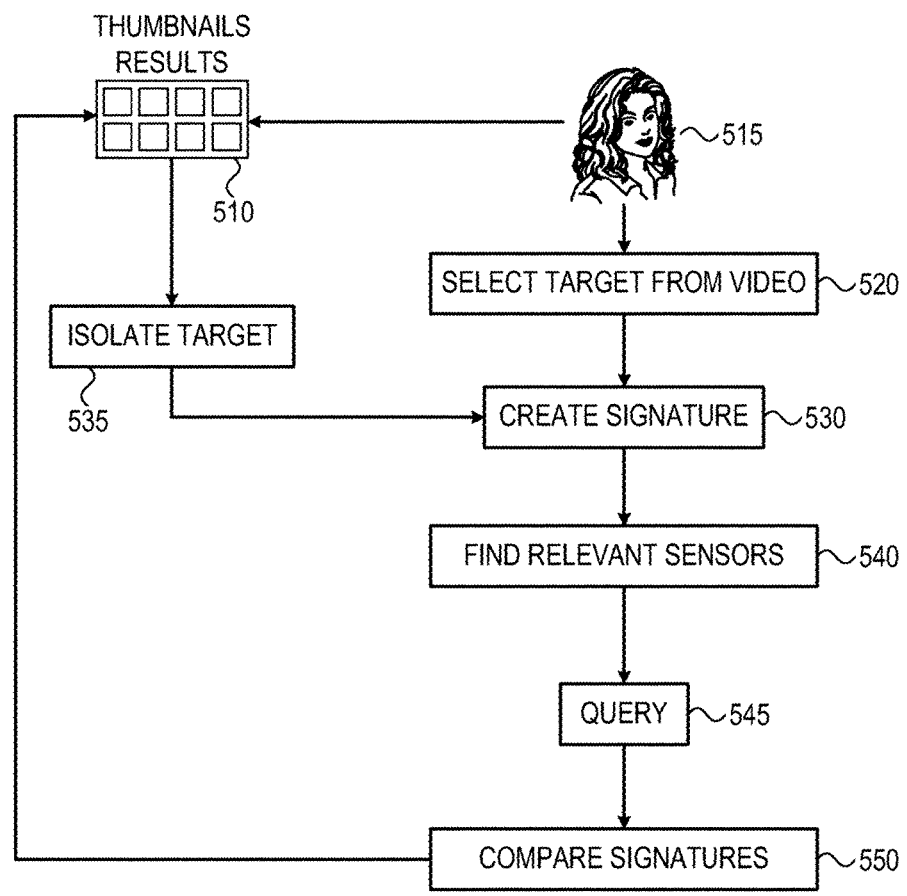
FIG. 5 is a flowchart describing a method according to embodiments of the invention.

Reference is now made to FIG. 5 that shows a flow or method according to embodiments of the invention. As shown by block 520, user 515 selects a video object for suspect search from results 510. As shown by 530, a signature may be generated for the selected object. As shown by 535, the target object of interest may be isolated or determined, e.g., using the signature and MAC addresses. The process of determining the object of interest may be iterative. For example, based on user feedback (e.g., indicating an object of interest is present or located in a location) and MAC addresses filtering, an embodiment enables isolating or pinpointing a suspect in a crowd by searching for the suspect based on a to MAC address. As described, finding or tracking an object of interest based on a MAC address may be combined with other methods, e.g., enhance a video signature as described herein.

As shown by 540, an embodiment of a system or method may automatically select receivers based on their location. For example, if user 515 indicates that a suspect is shown in a camera located at a specific gate in an airport then receivers located in the gate are selected and metadata provided by the selected receivers is examined. For example, a list of MAC address reported by the selected receivers is generated. As shown by 545, a query that searches for additional objects may be performed and as shown by block 550, signatures of additional objects may be compared to the signature of the selected target (e.g., the signature generated as shown by block 530). As shown by the arrow connecting blocks 550 and 510, the process may be iterative. In each iteration, the list of MAC addresses is revised. For example, a new temporary list may be generated for each iteration and MAC addresses included in a main list but are not included in a temporary list of an iteration are removed from the main list. Typically, the main list includes less MAC addresses with each additional iteration until, at some point, the main list may only include one MAC address. For example, the MAC address of a device used by a suspect being searched for or tracked may appear in the temporary list of each iteration and may therefore be associated with the suspect.

Figure 6:
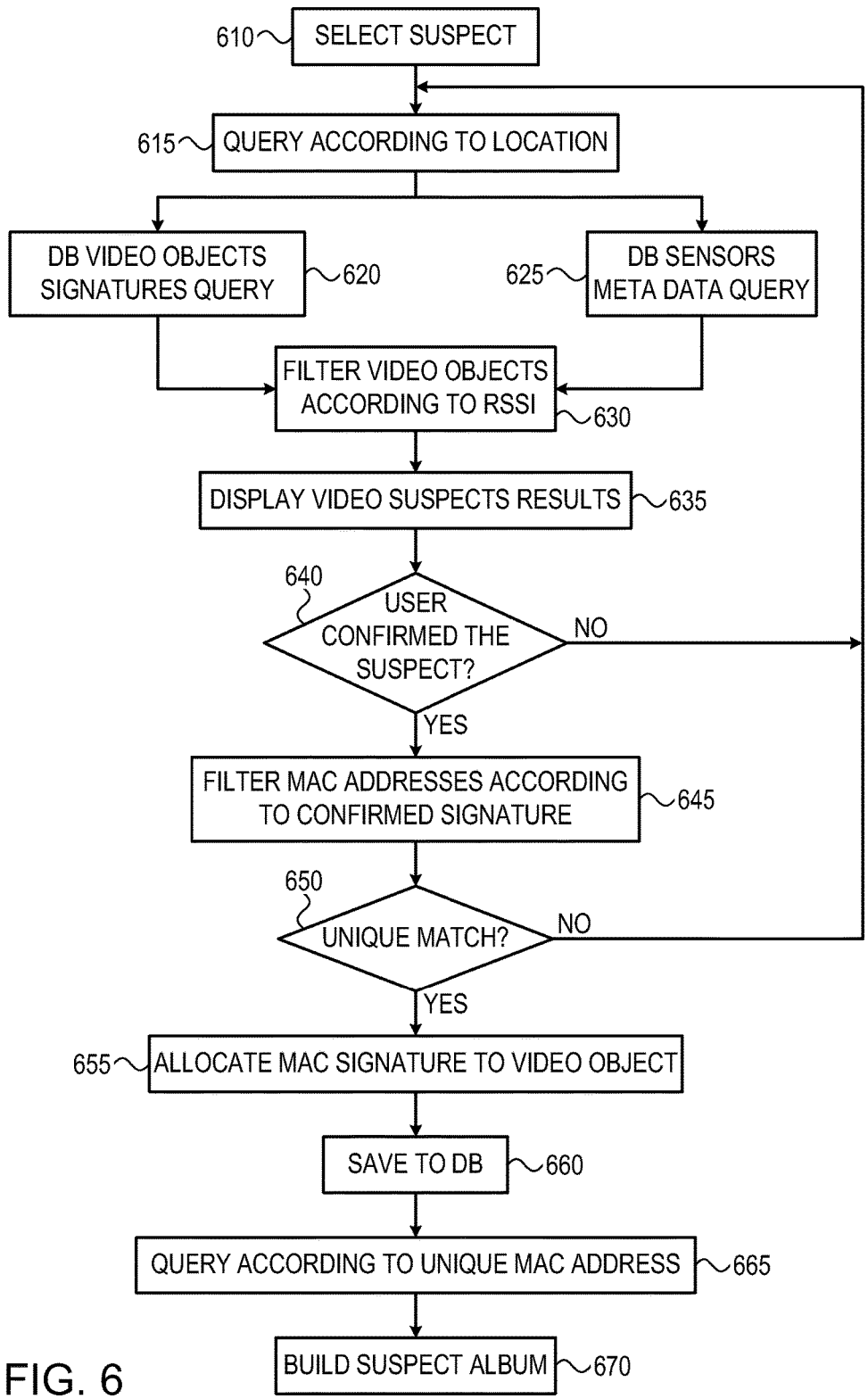
FIG. 6 is a flowchart describing a method according to embodiments of the invention.

Reference is now made to FIG. 6 that shows a flow or method according to embodiments of the invention. As shown by block 610, a user may select a suspect or an object of interest, e.g., from a set of presented images as described. As shown by block 615, a query according to location and time may be performed. For example, as shown by block 620, a query is made to a database and images associated with a signature that matches the signature of the selected object of interest may be retrieved. As shown by block 625, a query for receivers at a known location may be performed. For example, since the location of the camera that acquired the image of the selected suspect may be known, a query as shown by block 625 may extract from a database metadata provided by receivers in the known location.

As shown by block 630, video objects may be filtered out based on RSSI values. Video objects may be any objects or elements shown in a video. For example, people represented in a video may be referred to herein as video objects. Filtering out (e.g., removing) video objects as described herein may include filtering out people shown in a video. For example, objects in a region in a video image may be filtered out if no RSSI values are recorded as received from the region. For example, if no one with a mobile communication device is present in an area then no RSSI values are recorded for the area, in such case, and if it is known that the suspect is using a mobile phone, objects shown in the region may be excluded (or filtered out) from a search. In another case, if RSSI values in an area are below a threshold than objects in the area may be filtered out or excluded from a search. As described, each video object (object shown in a video or image) has a location in the FOV of the relevant camera. Accordingly, if a location or whereabouts of a suspect, person or object of interest are known or estimated based on RSSI values as described, then objects not in the known whereabouts may be excluded from a search.

As shown by block 635, results may be presented to a user. Results presented as shown by block 635 may include for example an image of a person. For example, after retrieving images from a database as described herein and possibly filtering out some of the images, an image of a person that may be the object of interest (or the suspect) may be presented to a user. As shown by block 640, an indication whether or not the object of interest is indeed identified may be received from a user. As shown by the arrow connecting blocks 640 and 615, if the object of interest was not identified or isolated a portion of the process may be repeated. For example, the process as described herein may be repeated for a different location, using data from a different set of receivers and using a different set of images or video footage, possibly acquired by a different set of cameras. An iteration of the process may be performed (e.g., if the user does not confirm the suspect is indeed identified or isolated). As shown by block 645, if a user confirmed that the object of interest was identified a MAC address list may be revised. For example, a list of possible MAC addresses may be examined and MAC addresses may be removed from the list if they were not detected in the location of the identified object of interest.

As shown by block 650, an embodiment of the invention may determine whether or not a unique match of a MAC address to an object of interest exists. For example, if after a number of iterations only one MAC address remains in a list of possible MAC addresses then an embodiment of the invention may determine that the one (or only) remaining MAC address is associated with (or related to) the object of interest. Accordingly, as shown by block 655, an embodiment of the invention may associate a MAC address with a video object. For example, a MAC address may be associated with an image indicated by a user as an image of an object of interest.

As shown by block 660, a matching or association of a MAC address with an object of interest may be stored in a database. For example, a signature that includes a unique characteristic of a mobile device, e.g., a MAC address, may be generated for the object of interest. For example, a signature generated based on an image of a suspect (or any other object of interest) may be updated to include a MAC address. Accordingly, in an embodiment, a signature includes a MAC address that may uniquely identify an object of interest. For example, to determine whether a RO is the same as a CO, MAC addresses in the respective signatures of the RO and CO may be compared.

As shown by block 665, a query according to a MAC address may be performed. For example, if an object of interest is associated with a unique MAC address then a query for the MAC address may retrieve metadata related to the MAC address. For example, metadata that records where and when an object was may be stored in a database, e.g., as described herein. Metadata that indicates where and when the object of interest was may be retrieved from a database, correlated with video footage and images of the object of interest may be automatically extracted from video images. For example, as described herein, metadata may indicate a location and a time where a MAC address was detected. Accordingly, provided with a known time and known location of an object of interest, video input provided by a camera placed at the known location and acquired at the known time may be examined and images of the object of interest may be extracted from the video input and included in an album of images of the object of interest. An album may include metadata. For example, images included in an album may be associated with a time stamp indicating when they were acquired. In an embodiment, camera location presents the object path on a map. The addition of locating a communication device as described, and optionally using other GIS data adds accuracy to the path determination. For example, a path can be determined even for times when no camera is able to acquire images of a suspect Reference is now made to FIG. 7, a flow or method according to embodiments of the invention. Generally, based on user approval of a video object query, e.g., an indication of a user that an image includes a person (or object of interest) for which a search is conducted, MAC addresses that were found to be in or near a location of the indicated person are recorded, e.g., in a main list. In a subsequent iteration, a user indicates the person is now seen in a second, different location. The MAC addresses found to be in or near the second location are recorded and the list of MAC addresses is revised such that only MAC addresses that appear in both locations remain in the list.

In an embodiment, only MAC addresses that appear in multiple locations where, based on user confirmation, the object of interest was present remain in the list. Any number of iterations may be performed, e.g., until only one MAC address remains in the list at which point a unique match between the MAC address and the object of interest may be determined. If a unique match is determined, a MAC address may be associated with an object of interest and the object of interest may be searched for by searching for the MAC address.

As shown by block 750, a location query may be performed. For example, based on an indication that an object of interest is or was present in a specific location, MAC address that were detected in the specific location (possibly at an indicated time) are retrieved from a database by a query to the database. For example, computing device 250 may generate and send a query to database 240 requesting all MAC addresses that were present or located at an indicated location and at an indicated time. As described herein, database 240 may store metadata provided by receivers 210 where the metadata includes a location and time of MAC addresses as described herein. As shown by block 755, some of the MAC addresses (or other characteristics) may be excluded from a list based on a threshold. For example, MAC addresses for which the recorded RSSI value (or set of values as described herein) is below a defined threshold may be excluded.

For example, signals from a communication device may be received by several receivers located in proximity, with several different levels of RSSI. Filtering low levels of RSSI may reduce the number of MAC address to process and thus improve a process of identifying a MAC address related to an object of interest.

As shown by block 760, an embodiment of the invention may determine whether a user confirmed that an object of interest is present in the location. For example and as described, images may be presented to a user (e.g., on display 251) and, if one of the images presented is indeed an image of the object of interest, the user may click on the image to indicate that this is an image of the object of interest thus providing confirmation or indication that the object of interest is present in the location. As shown, if no confirmation from a user is received then an embodiment of the invention may return to block 750 and an additional iteration (e.g., performed based on data related to a different location and time) may be carried out. As shown by block 765, MAC addresses from a previous iteration may be obtained. As shown by block 770, MAC addresses from a previous iteration may be compared to the MAC addresses obtained for the current iteration as shown by block 750. As shown by block 775, an embodiment of the invention may determine whether a match was found, e.g., a matching of a single MAC address to an object of interest was made. As shown, if no match is found, operations in an embodiment may be repeated, e.g., an additional iteration may be performed by a system according to an embodiment of the invention.

As shown by block 780, MAC addresses located or present in locations where and when the object of interest was present may be marked, e.g., these MAC addresses may be marked as candidate MAC address since they possibly belong to a communication device operated by the object of interest. For example, MAC addresses stored in database 240 may be marked. For example, each MAC address in database 240 may be associated with metadata and the metadata may include an entry or field for marking the MAC address as a candidate MAC address. Other marking methods may be used. As shown by block 785, MAC addresses that where detected in a location where, based on user input, the object of interest was not present, are removed from a list. As shown by block 790, the list of remaining MAC addresses is saved, e.g., for use in a subsequent iteration.

As shown by block 795, an embodiment of the invention may determine if a unique match exists. For example, if after removing some MAC addresses from a list as shown by block 785 only one MAC address remains in the list then an embodiment of a system or method may determine a unique match exists and may associate the MAC address with the object of interest. As described herein, a MAC address associated with an object of interest (e.g., a person or suspect) may be used to search for the person, track a suspect and so on.

Reference is additionally made to FIG. 8 that graphically shows manipulation of MAC addresses. FIG. 8 shows four iterations in each of which an indication from a user is received and a list of MAC addresses is revised. As shown by row 810, in a first iteration, a user indicates that an object of interest is present in location #1. For example, as shown by block 710 in FIG. 7, objects "A", "B" and "C" with MAC addresses 711 are present at location #1 and a user has indicated that object "B" is the object of interest.

Figure 7:
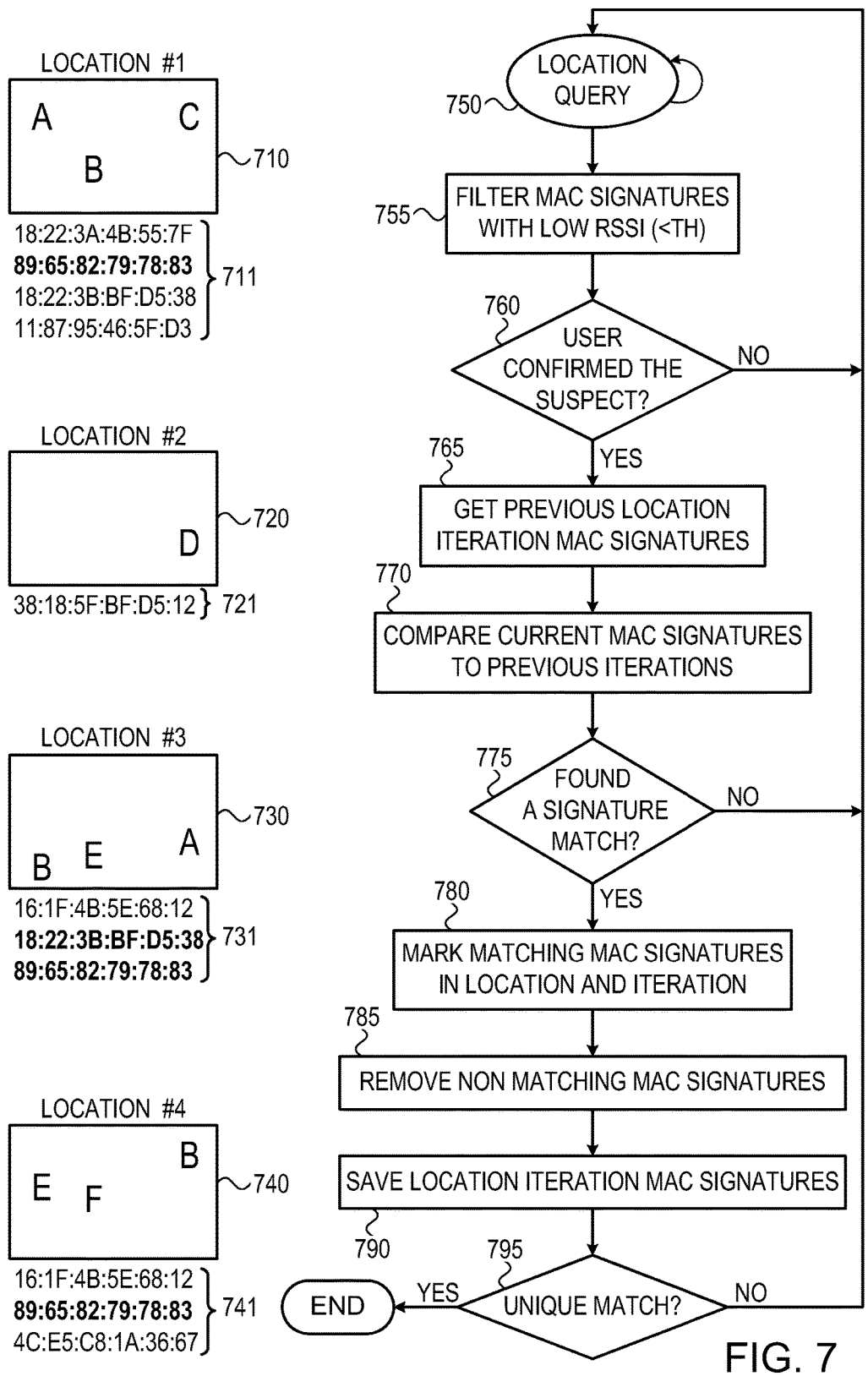
FIG. 7 shows a flowchart describing a method according to embodiments of the invention and related objects.

As shown by block 720 in FIG. 7, only object "D" with MAC address 721 is located or present in location #2 and object "B" is not present or located in that location. Accordingly and as shown by row 820, in a second iteration, a user indicates that the object of interest is not present in location #2. Accordingly, MAC addresses detected in location #2 are removed as shown by the strikethrough of MAC address 38:18:5F:BF:D5:12.

As shown by block 730, objects "A", "B" and "E" with the set of MAC addresses 731 are present in location #3. Accordingly and as shown by row 830, in a subsequent iteration, a user indicates that object "B" (the object of interest in this example) is present in location #3. Accordingly, the two MAC addresses 89:65:82:79:78:83 and 18:22:3B:BF:D5:38 that appear in both location #1 and location #3 are marked as candidate MAC addresses.

As shown by block 740, objects "E", "F" and "B" with MAC addresses 741 are present in location #4. Accordingly, as shown by row 840, a user indicates the object of interest is present in location #4. Accordingly, MAC addresses of objects "A", "E" and "F", which are not present in all locations where the object of interest ("B" in this example) is present and are further present in locations where the object of interest ("B" in this example) is not present are removed as indicated by the strikethrough of these addresses. As shown, after iteration #3, only one MAC address remains and therefore, an embodiment of the invention may associate the only remaining MAC address with the object of interest.

Figure 9:
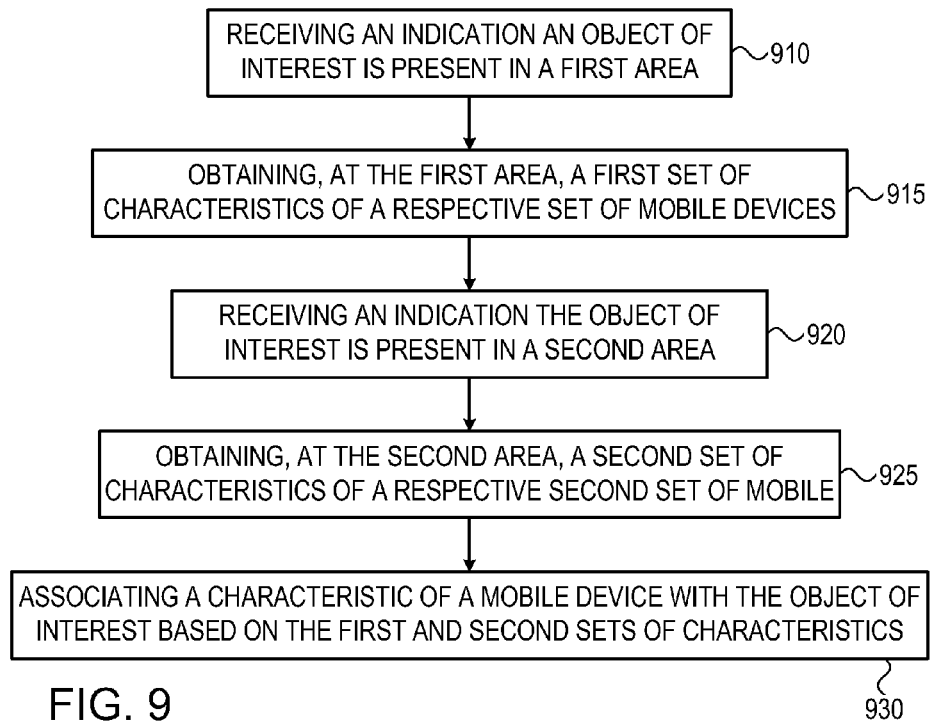
FIG. 9 is a flowchart describing a method according to embodiments of the invention.

Reference is made to FIG. 9 which shows a flowchart describing a method according to embodiments of the invention. As shown by block 910, an embodiment of the invention may receive an indication an object of interest is present in a first area. For example, a set of images is presented to a user and the user clicks on an image that shows the object of interest. An image clicked by the user may be associated with metadata, e.g., the location and time where and when the image was captured are known, e.g., based on a known location and/or FOV of the camera that acquired the image, based on metadata provided by the camera itself or based on a timestamp associated with the image. Using metadata associated with an image selected by a user, an indication that an object of interest is present in a first area is generated. For example, a unit or module in computing device 250 is provided with the location and generates an indication as described.

As shown by block 915, an embodiment of the invention may obtain, at the first area, a first set of characteristics of a respective set of mobile devices. For example, a set of receivers in an area or location may continuously receive signals transmitted by mobile communication devices in the area or location. As described, signals received by the receivers may be analyzed or processed to generate metadata. For example, MAC addresses may be extracted from received signals and a database may be updated such that the presence of communication devices in an area is recorded based on MAC addresses extracted from received signals. Accordingly, provided with a location, computing device 250 (or a unit therein) may obtain (e.g., retrieve from database 240) or select a set of characteristics of a respective set of mobile devices based on the location. For example, MAC addresses seen in a specific location at a specific time may be retrieved from database 240. For example, based on a query, database 240 may search metadata stored in database 240 as described herein and may provide a list of MAC addresses that were detected in the location and at the time specified in the query.

As shown by block 920, an embodiment of the invention may receive an indication the object of interest is present in a second area. For example, an indication may be received from a user. For example, presented with images of people in the second area, a user may indicate that the object of interest (e.g., a suspect) is present in the second area by using mouse 252 to click on one of the presented images or click on the suspect shown in an image. For example, a process may be iterative wherein after a first indication that the object of interest is present in a first area, a second indication indicating that the object of interest is present in a second area is received. For example, a user selects a second image of an object of interest, the second image taken at a second location.

As shown by block 925, an embodiment of the invention may obtain, at the second area, a second set of characteristics of a respective second set of mobile. For example, as described, signals of communication devices may be continuously received in a plurality of areas by a plurality of receivers. As described, the signals may be processed to generate metadata and metadata may be stored in a database. Accordingly, provided with a place and time where and when an object of interest was present, a database may be searched for metadata related to communication devices that are or were present at a given location and at a given time.

As shown by block 930, an embodiment of the invention may associate a characteristic of a mobile device with the object of interest based on the first and second sets of characteristics. For example, the sets of characteristics may be a set of MAC addresses. By examining a number of sets of MAC addresses, an embodiment of a system or method may identify a single MAC address that appears in each location and time where and when the object of interest appeared and may associate that MAC address with the object of interest.

Associating a unique characteristic of a communication device with an object of interest may include generating or updating a signature of the object of interest. For example, a MAC address may be included in a signature of an object or interest.

Figure 10:
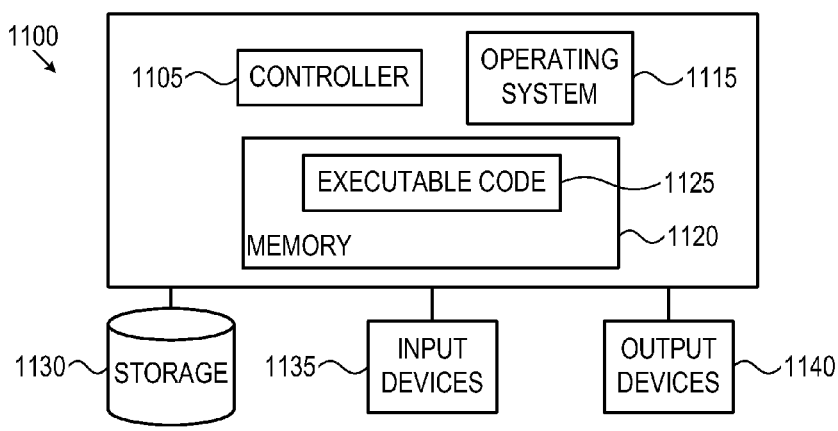
FIG. 10 is a high level block diagram of an exemplary computing device according to embodiments of the present invention.

Reference is made to FIG. 10, showing high level block diagram of an exemplary computing device according to embodiments of the present invention. Computing device 1100 may include a controller 1105 that may be, for example, a central processing unit processor (CPU), a chip or any suitable computing or computational device, an operating system 1115, a memory 1120, a storage 1130, an input devices 1135 and an output devices 1140. For example, computing device 250 may include components included in computing device 1100. For example, computing device 250 may include one or more controllers similar to controller 1105, computing device 250 may include one or more memory units similar to memory 1120 and computing device 250 may include one or more executable code segments similar to executable code 1125. Controller 1105 may be configured to carry out methods according to embodiments of the invention. For example, controller 1105 may be connected to memory 1120 storing software or instructions that when executed by controller 1105 cause controller 1105 to carry out method according to embodiments of the present invention.

Operating system 1115 may be or may include any code segment designed and/or configured to perform tasks involving coordination, scheduling, arbitration, supervising, controlling or otherwise managing operation of computing device 1100, for example, scheduling execution of programs. Operating system 1115 may be a commercial operating system. Memory 1120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1120 is a non-transitory processor-readable storage medium that stores instructions and the instructions are executed by controller 1105. Memory 1120 may be or may include a plurality of, possibly different memory units.

Executable code 1125 may be any executable code, e.g., an application, a program, a process, task or script. Executable code 1125 may be executed by controller 1105 possibly under control of operating system 1115. For example, executable code 1125 may be an application that receives an indication of a location of an object of interest, retrieve from a database a set of MAC addresses used by communication devices present at the indicated location and associates a MAC address with the object of interest, e.g., as described herein.

Where applicable, executable code 1125 may carry out operations described herein in real-time. Computing device 1100 and executable code 1125 may be configured to update process and/or act upon information at the same rate the information, or a relevant events, are received. For example, a search for a suspect as described herein may be performed in real-time. For example, signals and other data provided by receivers as described herein may be processed, in real-time, by computing device 250, such that the location of a suspect may be determined in real-time thus enabling tracking a suspect in real-time. In some embodiments, more than one computing device 1100 may be used. For example, a plurality of computing devices that include components similar to those included in computing device 1100 may be connected to a network and used as a system. For example, associating an object of interest with a characteristic of a communication device may be performed in real-time by executable code 1125 when executed on one or more computing devices such computing device 1100.

Storage 1130 may be or may include, for example, a hard disk drive, a Compact Disk (CD) drive, a CD-Recordable (CD-R) drive, a universal serial bus (USB) device or other suitable removable and/or fixed storage unit. In some embodiments, some of the components shown in FIG. 10 may be omitted. For example, memory 1120 may be a non-volatile memory having the storage capacity of storage 1130. Accordingly, although shown as a separate component, storage 1130 may be embedded or included in memory 1120.

Input devices 1135 may be or may include a mouse, a keyboard, a touch screen or pad or any suitable input device. It will be recognized that any suitable number of input devices may be operatively connected to computing device 1100 as shown by block 1135. For example, images of objects presented to a user may be presented on a display screen connected to computing device 1100.

Output devices 1140 may include one or more displays, speakers and/or any other suitable output devices. It will be recognized that any suitable number of output devices may be operatively connected to computing device 1100 as shown by block 1140. Any applicable input/output (I/O) devices may be connected to computing device 1100 as shown by blocks 1135 and 1140. For example, a wired or wireless network interface card (NIC), a modem, printer or a universal serial bus (USB) device or external hard drive may be included in input devices 1135 and/or output devices 1140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1120, computer-executable instructions such as executable code 1125 and a controller such as controller 1105.

A system according to embodiments of the invention may include components such as, but not limited to, a plurality of central processing units (CPU), e.g., similar to controller 1105, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of detecting an object of interest in a video, the method comprising:
retrieving, by a controller, from a database, a first set of automatically extracted object images that are associated with an area and time period indicated by a user;
presenting the first set of extracted object images to the user;
receiving, by the controller, an indication, from the user, that an object of interest is present in an object image in the first set of extracted object images, the object associated with an object signature, and the object image associated with the area and the time period indicated by the user;
extracting, by the controller, from the database, a first set of MAC addresses of a set of mobile communication devices located in the area and time period indicated by the user for the object of interest;
across a series of iterations:
retrieving, by the controller, from a database, a second set of extracted object images corresponding to a second area and second time period, the object images resulting from a search for the object of interest using the object signature;
receiving, by the controller, an indication, from the user, that the object of interest is present or is not present in the second set of extracted object images;
extracting, by the controller, from the database, a second set of MAC addresses of a set of mobile communication devices located in the second area and the second time period; and
filtering the first set of MAC addresses by:
if the user indication is that the object of interest is present, removing, by the controller, from the first set of MAC addresses, MAC addresses that are not present in the second set of MAC addresses; and
if the user indication is that the object of interest is not present, removing, by the controller, from the first set of MAC addresses, MAC addresses that are present in the second set of MAC addresses;
the filtered set of MAC addresses being used in a next iteration, if any, as the first set of MAC addresses;
iterating until a single MAC address object of interest remains in the first set of the MAC addresses; and
associating, by the controller, the MAC address with the object of interest.

2. The method of claim 1, further comprising obtaining a received signal strength indicator (RSSI) value for each of the set of mobile communications devices.

3. The method of claim 1 comprising tracking the object of interest by tracking the mobile communication device associated with the object of interest.

4. The method of claim 1 comprising obtaining a received signal strength indicator (RSSI) value for each mobile communications device of the set of mobile communications devices, and excluding from the first set of MAC addresses MAC addresses corresponding to a recorded RSSI value below a threshold.

5. The method of claim 1 comprising mapping received signal strength indicator (RSSI) value sets to points in a field of view of a camera and using the mapping to present a path traveled by the object of interest based on a signal generated by an associated mobile communication device.

6. The method of claim 1 comprising generating an alert upon detecting a presence of the mobile communication device.

7. A system comprising:
a plurality of receivers located at a plurality of areas and configured to receive MAC addresses of mobile communication devices located in the plurality of areas;
and a computing device including a memory and a controller, wherein the controller is configured to:
retrieve from a database a first set of automatically extracted object images that are associated with an area and time period indicated by a user;
present the first set of extracted images to the user;
receive an indication, from the user, that an object of interest is present in an object image in the first set of extracted object images, the object associated with an object signature, and the object image associated with the area and the time period indicated by the user;
extract from the database, first set of MAC addresses of a set of mobile communication devices located in the area and time period indicated by the user for the object of interest;
across a series of iterations:
retrieve, from a database, a second set of extracted object images corresponding to a second area and second time period, the object images resulting from a search for the object of interest using the object signature;
receive an indication, from the user, that the object of interest is present or is not present in the second set of extracted object images;
extract, from the database, a second set of MAC addresses of a set of mobile communication devices located in the second area and the second time period; and
filter the first set of MAC addresses by:
if the user indication is that the object of interest is present,
remove from the first set of MAC addresses, MAC addresses that are not present in the second set of MAC addresses; and;
if the user indication is that the object of interest is not present, remove from the first set of MAC addresses, MAC addresses that are present in the second set of MAC addresses;
the filtered set of MAC addresses being used in a next iteration, if any, as the first set of MAC addresses;
iterating until a single MAC address object of interest remains in the first set of the MAC addresses; and
associate the MAC address with the object of interest.

8. The system of claim 7 wherein the controller is further configured to obtain a received signal strength indicator (RSSI) value for each mobile communications device of the set of mobile communications devices, and exclude from the first set of MAC addresses, MAC addresses corresponding to a recorded RSSI value below a threshold.

9. The system of claim 7 wherein the controller is configured to track the object of interest by tracking the mobile communication device associated with the object of interest.

10. The system of claim 7, wherein the controller is further configured to obtain a received signal strength indicator (RSSI) value for each of the set of mobile communications devices.

11. The system of claim 7 wherein the controller is configured to map received signal strength indicator (RSSI) value sets to points in a field of view of a camera and, using the mapping, present a path traveled by the object of interest based on a signal generated by an associated mobile communication device.

12. The system of claim 7 wherein the controller is configured to generate an alert upon detecting a presence of the mobile communication device.

13. The system of claim 7, comprising a plurality of cameras, wherein at least one camera and at least one receiver are included in a unit and are calibrated such that mapping of RSSI values and regions in a field of view (FOV) of the at least one camera are known, and wherein the controller is further configured to present a path traveled by the object of interest, using the mapping and based on a signal generated by the associated mobile communication device.

14. A non-transitory computer-readable medium storing instructions which, when executed by a controller, cause a computer to perform a method of detecting an object of interest in a video, the method comprising:
retrieving, by the controller, from a database, a first set of automatically extracted object images that are associated with an area and time period indicated by a user;
presenting the first set of extracted object images to the user;
receiving, by the controller, an indication, from the user, that an object of interest is present in an object image in the first set of extracted object images, the object associated with an object signature, and the object image associated with the area and the time period indicated by the user;
extracting, by the controller, from the database, a first set of MAC addresses of a set of mobile communication devices located in the area and time period indicated by the user for the object of interest;
across a series of iterations:
retrieving, by the controller, from a database, a second set of extracted object images corresponding to a second area and second time period, the object images resulting from a search for the object of interest using the object signature;
receiving, by the controller, an indication, from the user, that the object of interest is present or is not present in the second set of extracted object images;
extracting, by the controller, from the database, a second set of MAC addresses of a set of mobile communication devices located in the second area and the second time period; and filtering the first set of MAC addresses by:
   if the user indication is that the object of interest is present, removing, by the controller, from the first set of MAC addresses, MAC addresses that are not present in the second set of MAC addresses; and
   if the user indication is that the object of interest is not present, removing, by the controller, from the first set of MAC addresses, MAC addresses that are present in the second set of MAC addresses;
the filtered set of MAC addresses being used in a next iteration, if any, as the first set of MAC addresses;
iterating until a single MAC address object of interest remains in the first set of the MAC addresses;
associating, by the controller, the MAC address with the object of interest; and
mapping received signal strength indicator (RSSI) value sets to points in a field of view of a camera and using the mapping to present a path traveled by the object of interest based on a signal generated by an associated mobile communication device.

15. The method of claim 2, comprising storing the MAC addresses and RSSI values in the database.

16. The method of claim 1, comprising generating signatures for the object images in real time.

17. The method of claim 1, comprising storing the object signature in the database.

* * * * *